Oct. 20, 1959

G. L. HASSLER ET AL 2,909,058

APPARATUS FOR MEASURING AND CONTROLLING
THE COMPOSITION OF VAPOR

Filed Nov. 8, 1954

INVENTOR.
GERALD L. HASSLER
WILLIAM WARREN
JOHN S. EGAN

BY
ATTORNEY

INVENTOR.
GERALD L. HASSLER
WILLIAM WARREN
JOHN S. EGAN
BY
ATTORNEY

United States Patent Office 2,909,058
Patented Oct. 20, 1959

2,909,058

APPARATUS FOR MEASURING AND CONTROLLING THE COMPOSITION OF VAPOR

Gerald L. Hassler and William Warren, Los Angeles, and John S. Egan, Inglewood, Calif., assignors to Burton Manufacturing Company, Los Angeles, Calif., a corporation of California Application November 8, 1954, Serial No. 467,492

8 Claims. (Cl. 73—17)

This invention relates in general to certain new and useful improvements in apparatus for measuring and controlling the composition of vapor by pressure, temperature, and visual observation of the dew or frost point and, more particularly, to an automatic dew point hygrometer.

In many scientific and industrial operations it is necessary to ascertain and control the composition of a vapor or gas which contains moisture or some other condensible fraction. In some instances, it is merely sufficient to measure and record this physical characteristic of the gas. In other cases, it is desirable to monitor, or establish some type of control over, a process employing the gas. In any case, it has conventionally been the practice to take a sample of gas and analyze the sample to determine its physical composition in terms of condensible constituents by methods of quantitative analysis in a laboratory. This, of course, can be done with reasonable accuracy by passing the gas samples through a series of absorption vessels, such as the Orsat apparatus and determining the quantities of absorbed material. It is also possible to subject the sample to fractional condensation of one type or another and measure the quantity of a particular condensate or series of condensate fractions from which the amount of condensible compounds or fractions can be ascertained. Obviously, these laboratory methods are slow, tedious, costly, and time-consuming. Frequently, it is difficult to carry such methods out with any satisfactory degree of accuracy because of the inherent difficulties involved in obtaining accurate samples of gases which are being processed or conveyed through pipelines at high pressure. Above all else, it is virtually impossible to carry out such analytical procedures with sufficient speed to enable the establishment of control over the process or a modification of the constituency of the gas if, for any reason, it should not meet with some predetermined standard.

It is, therefore, the primary object of the present invention to provide apparatus for quantitatively measuring the condensible constituent or constituents of a gas while the gas is under high pressure and flowing at substantial velocity.

It is another object of the present invention to provide an apparatus for continuously measuring the composition of a gas in terms of its condensible constituent or constituents and establishing a control with respect thereto.

It is an additional object of the present invention to provide apparatus for quantitatively measuring the condensible constituent or constituents within a gas in a continuous and automatic manner.

It is another object of the present invention to provide an apparatus whereby a continuous record can be obtained of the dew point of a stream of gas at any constant pressure or during changing pressures.

It is also an object of the present invention to provide apparatus of the type stated whereby a continuous record can be obtained of the pressure of dew formation at a constant temperature or at a varying temperature.

It is also an object of the present invention to provide apparatus of the type stated which, by reason of instantaneous access, can be cleaned or serviced very readily and will, therefore, operate in an essentially uninterrupted way.

It is also an object of the present invention to provide apparatus of the type stated which can be readily manufactured with precision and at comparatively low cost.

It is a further object of the present invention to extend the range of information which can be obtained about the composition of a fluid by providing apparatus and methods for observing with a microscope the appearance of the dew or precipitate simultaneously with the measurement of recording of the temperature and pressure conditions of its occurrence.

It is a further object of the present invention to improve the precision, reliability, and significance of the dew point measurement by providing means for adjusting the temperature of the dew point chamber, either manually or automatically, to a known value.

With the above and other objects in view, our invention resides in the novel features of form, construction, arrangement, and combination of parts presently described and pointed out in the claims.

In the accompanying drawings (seven sheets)—

Figure 1:
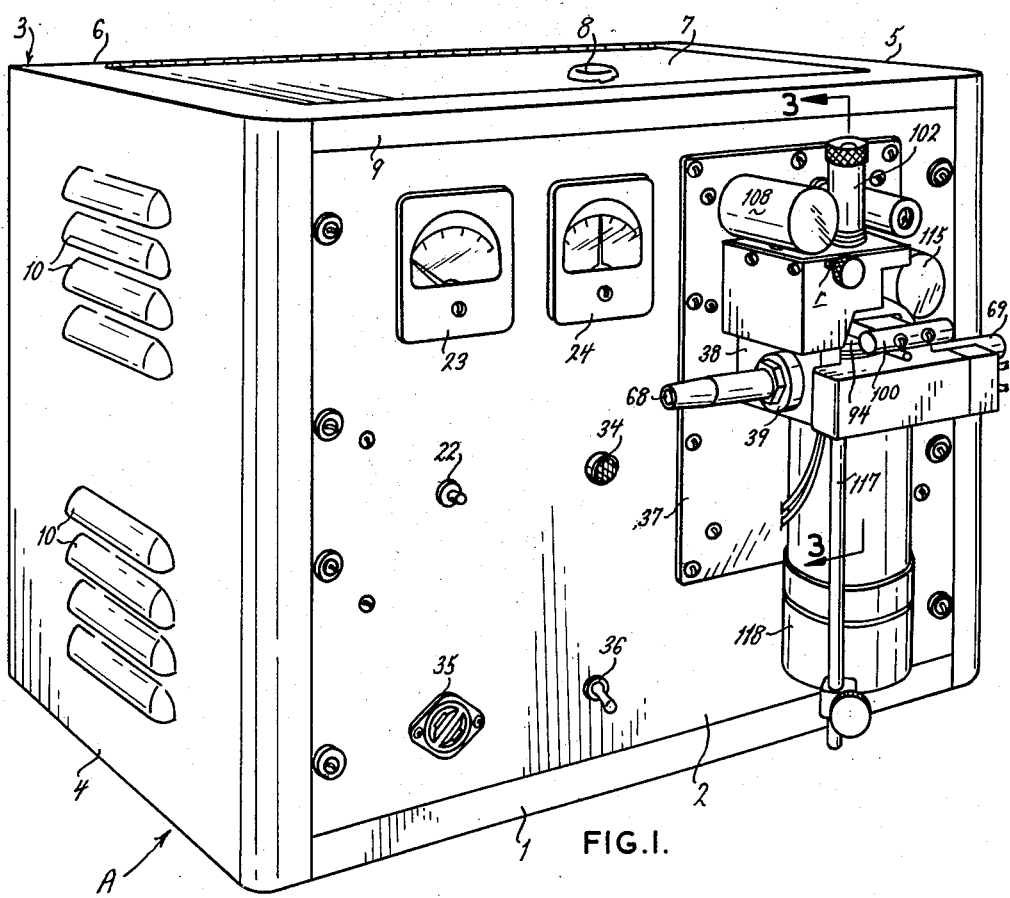
Figure 1 is a perspective view of a gas analysis apparatus constructed in accordance with and embodying the present invention.
Figure 8:
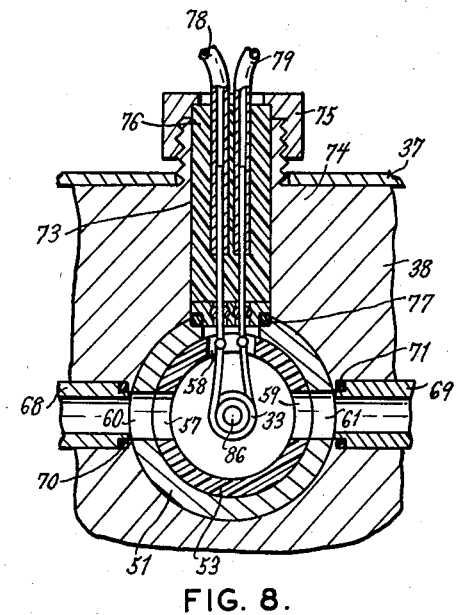
Figure 5:
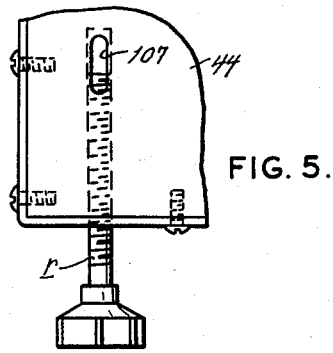
Figure 9:
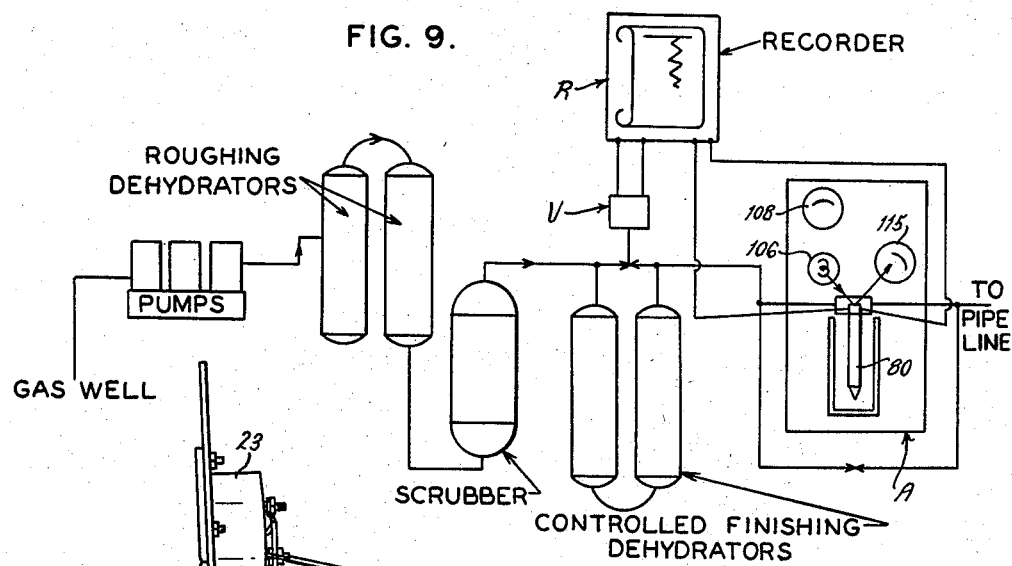
Figure 2:
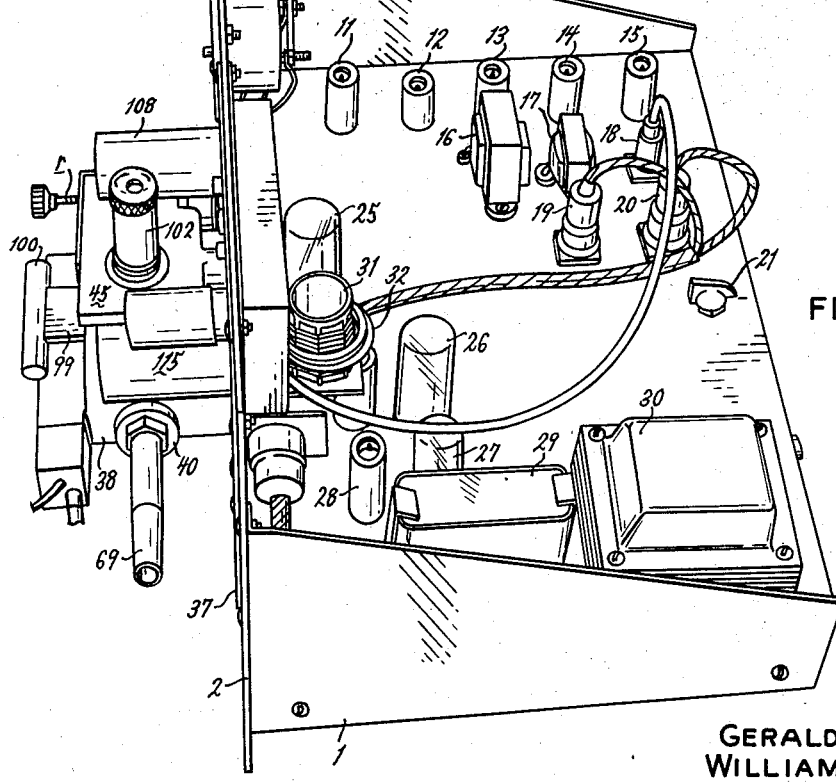
Figure 2 is a perspective view of the gas analysis apparatus of the present invention with the external housing removed to show more clearly the internal construction thereof.
Figure 3:
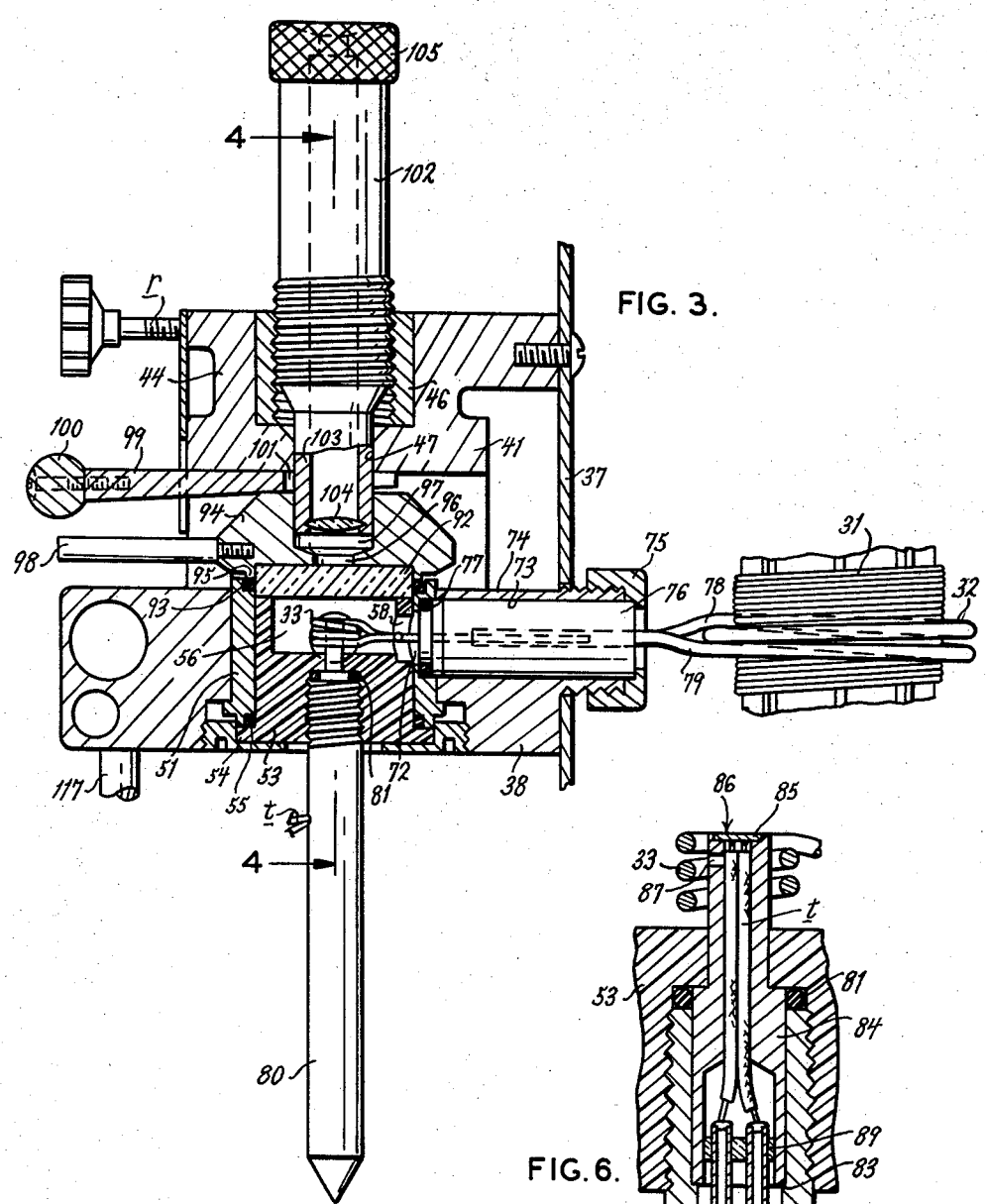
Figure 3 is a fragmentary sectional view taken along line 3—3 of Figure 1.
Figure 4:
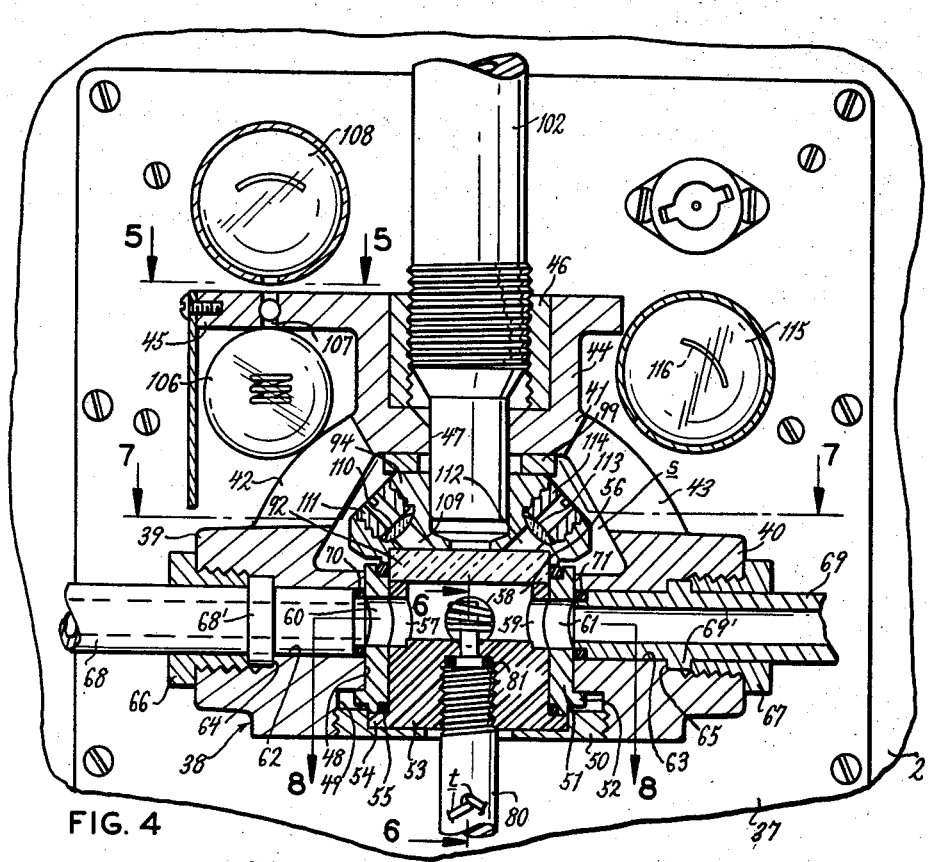
Figure 4 is a fragmentary sectional view taken along line 4—4 of Figure 3.
Figure 7:
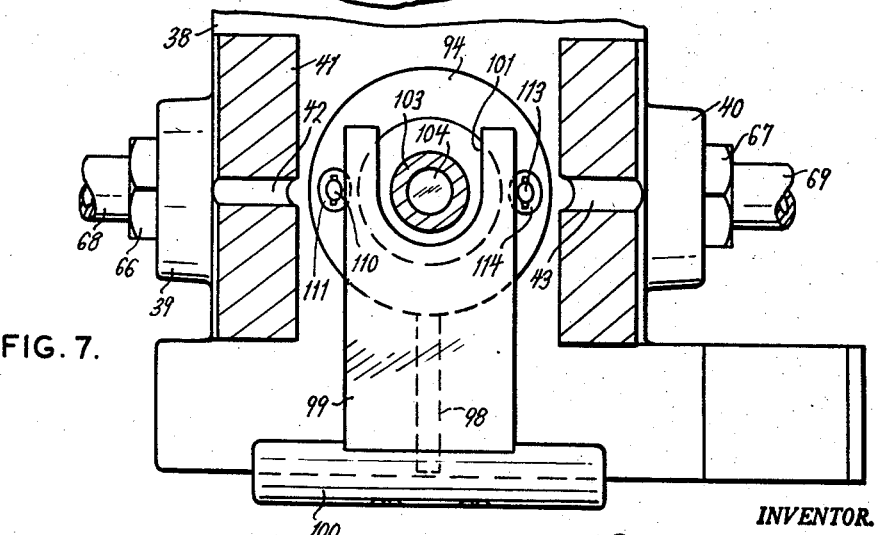
Figure 13:
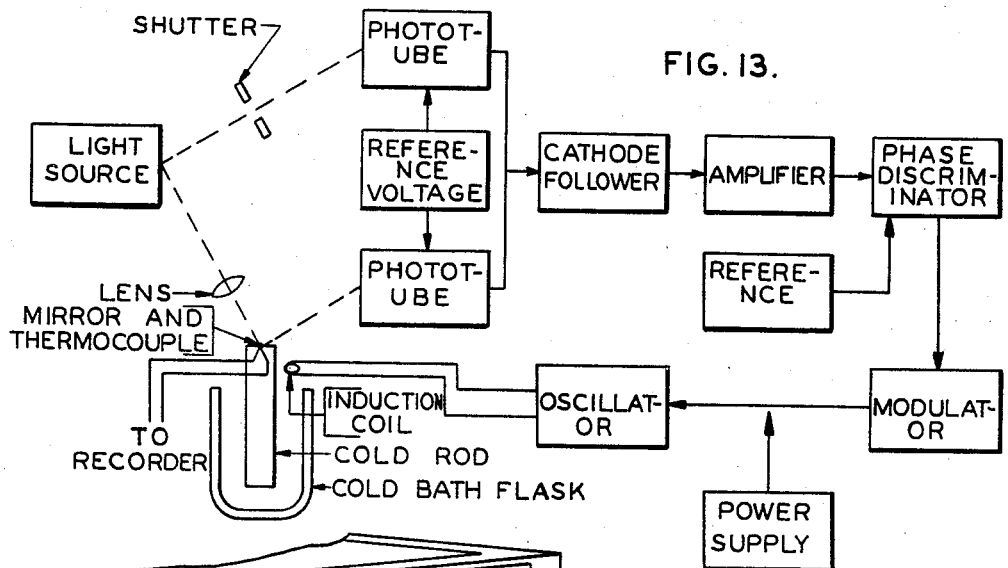
Figure 10:
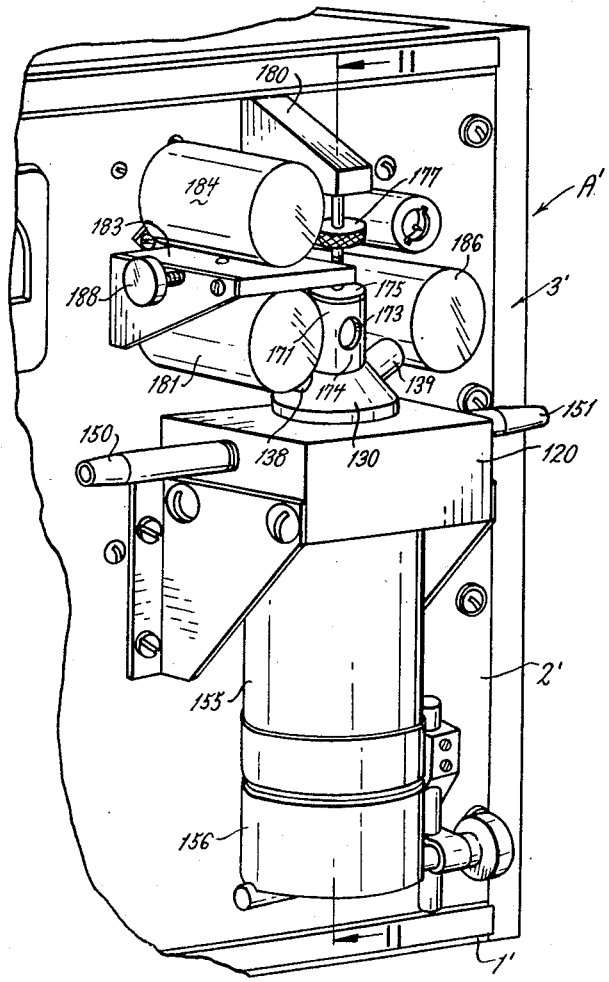
Figure 11:
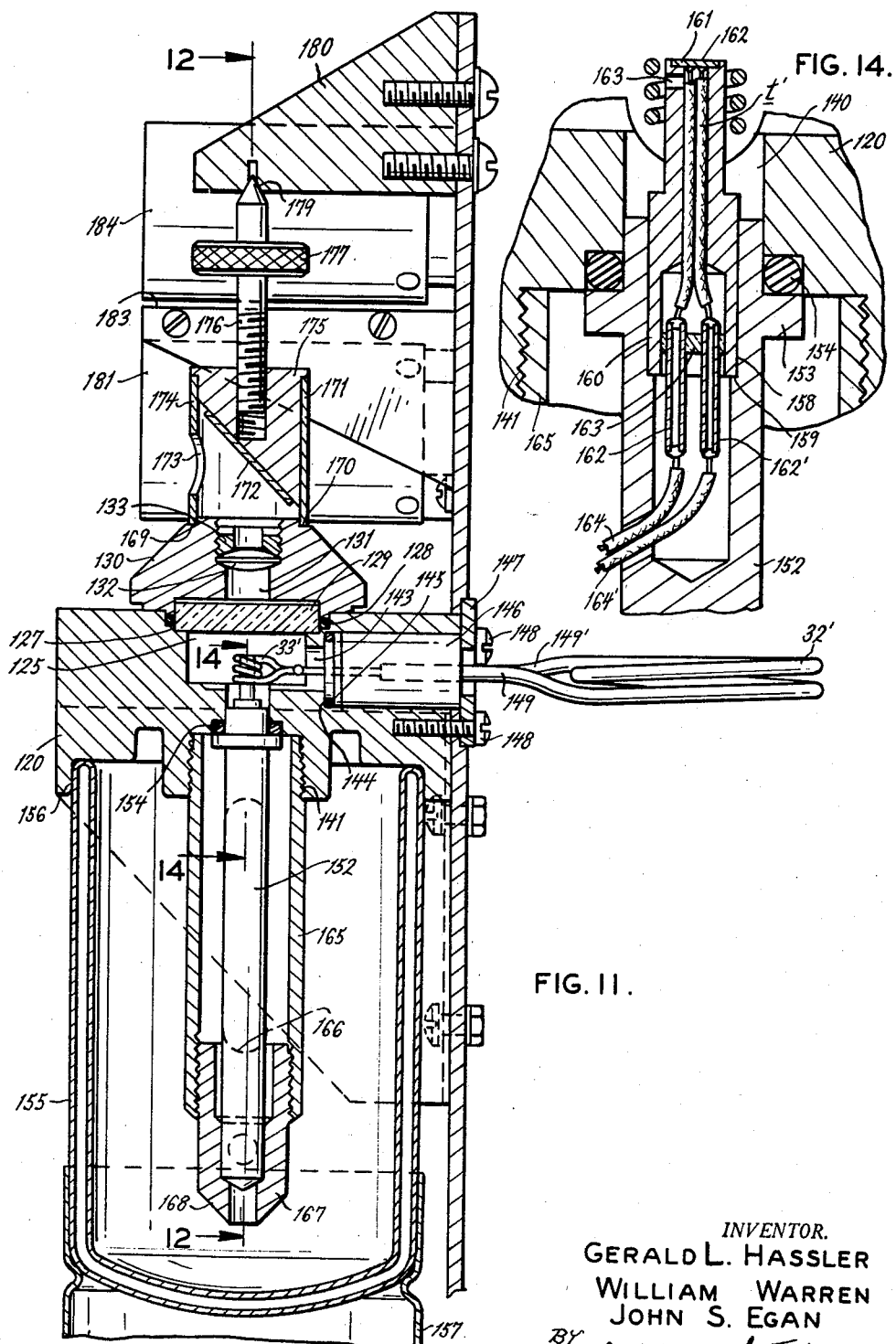
Figure 12:
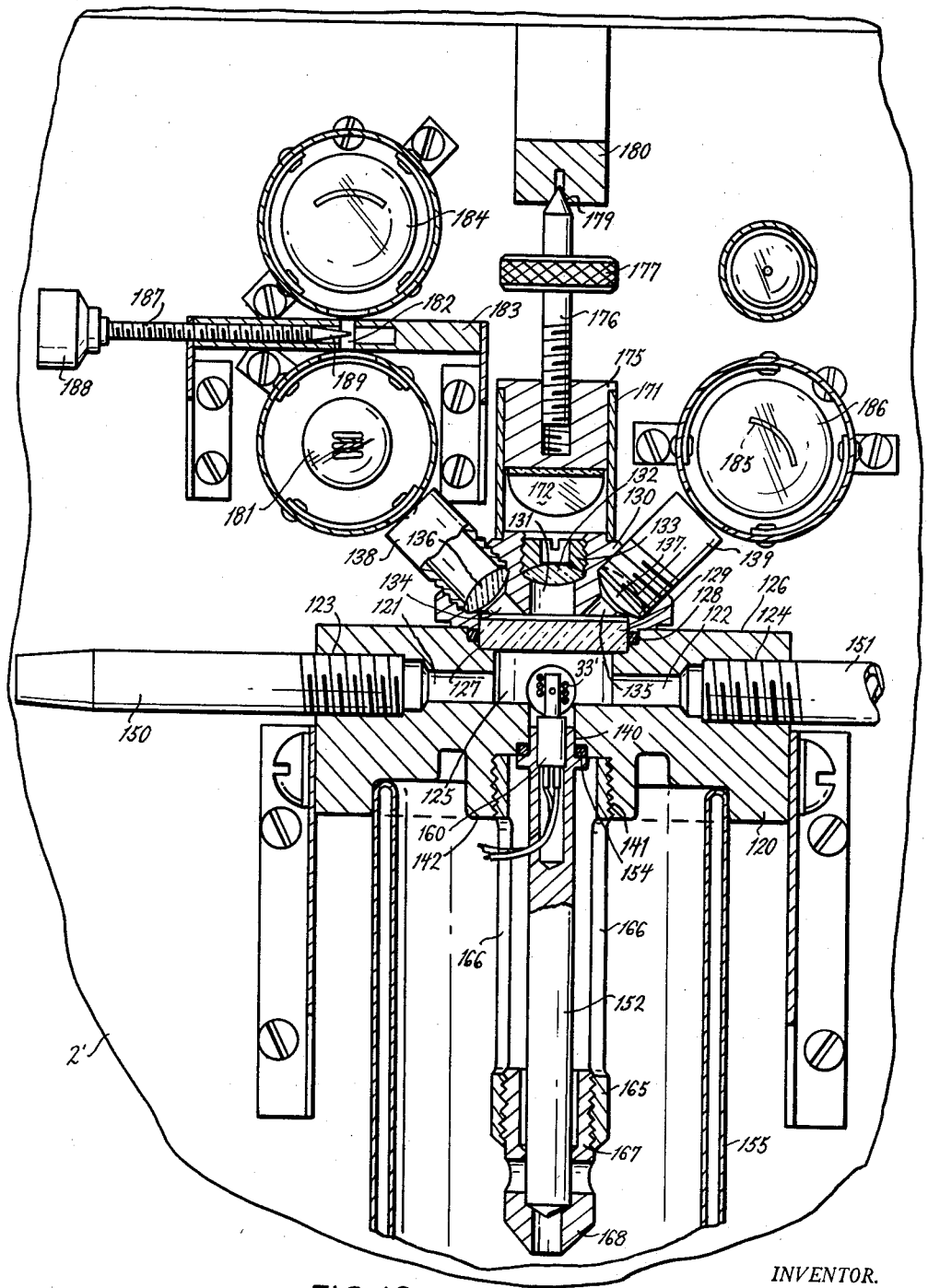

Figures 5, 6, 7, and 8, are fragmentary sectional views taken along lines 5—5, 6—6, 7—7, and 8—8, respectively, of Figure 4;

Figure 9 is a diagrammatic view of a gas processing plant illustrating schematically the application thereto of a gas analysis apparatus of the present invention;

Figure 10 is a fragmentary perspective view of a modified form of dew point hygrometer constructed in accordance with and embodying the present invention;

Figure 11 is a vertical sectional view taken along line 11—11 of Figure 10;

Figure 12 is a vertical sectional view taken along line 12—12 of Figure 11;

Figure 13 is a diagrammatic view showing the electrical components of the present invention and the functional relation therebetween; and Figure 14 is a fragmentary sectional view taken along line 14—14 of Figure 11.

Referring now in more detail and by reference characters to the drawings, which illustrate a preferred embodiment of the present invention, A designates a continuous hygrometer comprising a horizontal base panel or chassis 1, a vertical front panel 2, and a removable shell or housing 3 comprising side walls 4, 5, a back wall 6, and a lid-like top wall 7 hingedly connected to the back wall 6 and provided with a finger-grip ring 8, whereby the top wall 7 may be lifted to afford access to the interior of the housing 3. The side walls 4, 5, are arranged for snug-fitting engagement along their forward vertical edges with the front panel 2 and are connected, adjacent their upper end, by a transverse rail 9, which also fits snugly against the top margin of the front panel 2 to form a complete enclosure for the apparatus. The side walls 4, 5, are also preferably, though not necessarily, provided with a series of conventional ventilating louvers 10 to permit circulation of air through the interior of the housing for cooling the various electrical components of the apparatus during operation.

Operatively mounted within the housing 3 upon the base panel or chassis 1 is a series of electronic components 11, 12, 13, 14, 15, 16, 17, 18, 19, 20, a balancing rheostat 21, and a main switch 22, which are operatively connected to each other in a conventional feed-back circuit for purposes presently more fully appearing. The feed-back circuitry, however, does not, in and of itself, constitute a part of the present invention and, therefore, is not specifically shown or discussed. Respectively mounted upon the front panel 2 and chassis 1 are meters 23, 24, and additional electronic components 25, 26, 27, 28, 29, 30, the latter being operatively connected to each other, to the meter 24, and to a high-frequency coil 31 having the usual heavy copper secondary 32 through which a heat generating high-frequency current may be transmitted to a work coil 33. The meter 24 will give a reading of the output on the work coil 33 to permit precise control thereof. The particular components 25, 26, 27, 28, 29, 30, the meters 23, 24, and the high-frequency coil 31 are connected by conventional circuitry to provide a high-frequency generator, the details of which are not part of the present invention and, therefore, are not particularly shown or described herein. However, the use of such a circuit, in conjunction with the work coil 33 for the purposes hereinafter disclosed, constitutes a part of the present invention and will be more fully described hereinafter.

Operatively mounted in the front panel 2 are a pilot light 34, a plug-in type electrical connector 35, and a push-button switch 36, all for purposes presently more fully appearing.

Also mounted upon the front panel 2 is an auxiliary mounting plate 37, upon the outwardly presented face of which is rigidly mounted a main casting 38 having substantial mass and being formed with laterally presented axially aligned intake and outlet bosses 39, 40, connected by a saddle-shaped yoke 41 having opposed sight apertures 42, 43, and a centrally located upstanding top housing 44, which is integrally provided at its upper end with a horizontal flange 45 and is bored downwardly from its upper face to receive a snug-fitting internally threaded sleeve 46. Below the sleeve 46, the top housing 44 is drilled and counterbored to provide an aperture 47, which opens downwardly into a somewhat open space $s$ between the yoke 41 and the main body of the casting 38.

Midway between the inlet and outlet bosses 39, 40, and in axial alignment with the aperture 47 of the top housing 44, the casting 38 is drilled in the provision of a substantially cylindrical vertical bore 48, which is counterbored at its lower end to provide a recess 49, the latter, in turn, being threaded at its lower end for receiving a shouldered locking disk 50. Snugly fitted within the bore 48 is a sleeve 51 having an integrally forward diametrally enlarged flange or annular shoulder 52, which bears against the downwardly presented end face of the recess 49. Snugly fitted within the sleeve 51 is a cylindrical plug 53 formed preferably of nylon or similar athermanous material and integrally provided at its lower end with a diametrally enlarged annular flange 54 for seated engagement against the downwardly presented end face of the sleeve 51 and sealed thereagainst by means of an annular gasket 55, being forced upwardly into tightly sealed engagement by the closure plate 50. At its upper end, the plug 53 is concentrically bored to provide a relatively large upwardly opening cylindrical chamber 56, the side walls of which are radially bored to provide passageways or ports 57, 58, 59. The ports 57 and 59 are aligned with similarly bored ports 60, 61, respectively, which are drilled in the sleeve 51 in concentric alignment with zores 62, 63, in the bosses 39, 40. The bores 62, 63, are, in turn, counterbored to provide seat shoulders 64, 65, respectively, and outwardly therefrom are internally threaded for receiving bushing sleeves 66, 67.

Removably mounted with the bores 62, 63, respectively, are inlet and discharge pipes 68, 69, integrally provided with diametrally enlarged collars 68', 69', adapted for tight seated engagement against the shoulders 64, 65, respectively. At their inner ends, the pipes 68, 69, are externally turned down to receive gaskets 70, 71, which provide a gas-tight or pressure-tight seal.

The sleeve 51 is also provided with a port or opening 72, which is concentrically aligned with the opening 58 in the cylindrical plug 53 and, at its outwardly presented end, communicates with a bore 73 drilled in a tubular boss 74, which forms an integral part of the main casting 38 and is externally threaded on its outer end to receive a centrally apertured collar nut 75. Snugly fitted within the bore 73 is a nylon bushing 76, which is annularly turned down at its inner end and provided with a sealing gasket 77, being forced into seated engagement therewith by the collar nut 75. Sealed into the nylon bushing 76 and extending axially therethrough are electrical leads 78, 79, for connecting the work coil 33 to the oscillator secondary 32. It is, of course, obvious that the leads 78, 79, are pressure-tight so that no gas may leak from the chamber 56. It will also be noted that the work coil 33 is centered within the chamber 56 and is more or less in direct line of the flow of gas between the inlet pipe 68 and the outlet pipe 69.

The cylindrical plug 53 is centrally bored and internally threaded upwardly from its under face for accommodating the upper threaded end of a cold rod 80, which projects downwardly therefrom for immersion in an ice bath or other temperature-reference medium. At its upper end, the cold rod 80 is turned down to provide an annular seat for a ring gasket 81, which serves to provide a pressure-tight seal for the cold rod 80. At its upper end, the cold rod 80 is axially bored to provide an elongated recess 82 having an intermediate, relatively narrow annular shoulder 83, upon which is seated a tubular insert 84, projecting upwardly therefrom through a concentric aperture in the bottom of the cylindrical plug 53 and into the chamber 56, terminating centrally within the work coil 33, as best seen in Figure 6.

Tightly fitted within the upper end face of the insert 84 is a very thin disk 85 having an upwardly presented polished mirror-surface 86. In order that the disk 85 will not be deflected by pressure within the chamber 56, an aperture 87 is provided in the insert 84, so that both sides of the disk 85 are subjected to the same pressure. Secured against the under face of the disk 85 is a thermocouple $t$ having leads extending downwardly through the tubular insert 84 and connectors 88, 88', which are sealed in and extend through a glass disk 89 seated in pressure-tight relation within the lower portion of the insert 84. Electrically connected to the connectors 88, 88', and extending outwardly through the cold rod 80 are electrical connection wires 91, 91', by which the thermocouple $t$ is connected to the meter 23.

The upper horizontal end of the cylindrical plug 53 is faced off to provide a smooth seat for a heavy glass closure plate 92, which is diametrally sized for snug-fitted disposition within the interior of the sleeve 51. The closure plate 92 is relatively thick and extends upwardly beyond the upper end face of the sleeve 51, being encircled with a ring gasket 93 for pressure-tight fit. Snugly fitted over and around the upper end of the glass closure plate 92 is a heavy metal sealing collar 94 having a downwardly presented annular flange 95, which bears against the sealing gasket 93. The sealing collar 94 is centrally bored with a vertical passage 96 enlarged at its upper end to provide a recess 97, which is coaxially aligned with the bore 47 of the top housing 44. The sealing collar 94 is also provided with a forwardly extending handle-forming rod 98 which facilitates handling thereof. Provided for wedging engagement against the upwardly presented surface of the sealing collar 94 is a flat steel wedge 99 provided on its outer end with a suitable handle or knob 100 and being provided at its interior end with a U-shaped clearance slot 101, large enough to fit entirely around, and not interfere with, the bores 47 and 97. By removal or insertion of the wedge 99, the sealing collar 94 and the glass closure plate 92 can be quickly removed and replaced to permit access to the interior of the chamber 56 for cleaning and repair. The wedge 99 serves to seal the glass closure plate 92 over the chamber 56 in a pressure-tight manner.

Threadedly mounted in, and extending vertically through, the sleeve 46 is a microscope 102, having a diametrally reduced objective end 103 which extends downwardly through the bore 47 and clearance slot 101 into the chamber 97. The microscope 102 is conventionally provided at its lower end with a lens 104 and at its upper end with an eye piece 105. Mounted on the auxiliary plate 37 and extending outwardly therefrom beneath the flange 45 is an electric light source 106, the beams from which pass upwardly through an aperture 107 in the flange 45 and impinge upon a balancing photocell 108 operatively mounted upon the auxiliary plate 37. Interposed in the aperture 107 is a shutter-like rod $r$ which can be manually adjusted when necessary to reduce the volume of light impinging on the photocell 108. The light rays from the light source 106 also pass obliquely downwardly through the aperture 42 in the yoke 41 and through a light passage 109 formed in the sealing collar 94. In order that the light rays may be concentrated, the light passage 109 is provided with a small condensing lens 110 removably held therein by means of a threaded sleeve 111. The sealing collar 94 is also provided with a second light passage 112 located diametrically on the opposite side thereof with respect to the light passage 109. This light passage 112 is similarly provided with a condensing lens 113 held in place by a threaded collar 114. The angular relationship of the axis of the two light passages 109, 112, are such that they are equal and opposite with reference to a perpendicular line passing through the center of the mirror-surface 86 of the disk 85. In other words, they bear the relationship to each other of an angle of incidence and an angle of reflection.

Operatively mounted upon the auxiliary plate 37 in outwardly spaced relation to the light passage 112 is a sensory photocell 115 having an element 116 in line with the axis of the light passage 112. Thus, light rays from the light source 106 will pass downwardly through the condensing lens 110 in the light passage 109 and impinge upon the mirror-surface 86 of the disk 85, being reflected therefrom outwardly through the light passage 112 and condensing lens 113 to the element 116 of the sensory photocell 115.

Rigidly mounted in and depending from the underside of the main casting 38 is a rod 117 for adjustably supporting a cup 118 in which crushed ice, ice water, or other temperature-reference material may be placed for immersion of the cold rod 80. As a result, the disk 85 will normally maintain a temperature exactly equal to that of the cold rod 80.

As long as the mirror-surface 86 is free of any condensation or dew, the amount of light reflected will be substantially equal to the amount of incident light. Consequently, the balancing photocell 106 and the sensory photocell 115 can be adjusted through a suitable circuit involving the electronic components 11 to 21, inclusive. The balancing rheostat 22 is used to establish a null reading. At the same time, the temperature of the mirror-surface disk 85 can be adjusted to within one-tenth of a degree centigrade of the desired dew point by appropriate settings of the high-frequency electrical circuit associated with the work coil 33, as indicated by the thermocouple $t$. By reason of the fact that the casting 38 is massive and the plug 53 is made of nylon, the temperature of the disk 85 will not fluctuate and in any case if such fluctuations were to occur they would be evident from the meter 23 which is in circuit with the thermocouple $t$.

Thereupon, moist gas or vapor containing some condensible fraction, can be passed through the chamber 56 from the inlet pipe 68 through the outlet pipe 69. The disk 85, being in direct thermal-contact with the cold rod 80 will be maintained at the temperature of the cold medium in which the cold rod 80 is immersed. Consequently, the moisture in the gas will condense upon the mirror-surface 86 of the disk 85 producing a cloudy film thereover, which will reduce the amount of light reflected to the sensory photocell 115. This reduction in reflected light is directly proportioned to the moisture content of the gas within the chamber 56. Furthermore, it has been found in connection with the present invention that the amount or density of the cloudy film upon the mirror-surface 86 will vary almost immediately upon any variation in moisture content of the gas passing through the chamber 56. In fact, the response is extremely close. Therefore, the amount of reflected light impinging upon the sensory photocell 115 will vary in very close and precisely direct relation to variations in moisture content of the gas passing through the chamber 56. The difference in the amount of light impinging upon the balancing photocell 108 and the sensory photocell 115 can be measured in the usual conventional potentiometer bridge circuit or in some other type of suitable electronic circuit and the differential will be a measure of the moisture content of the gas.

The hygrometer A can be employed in a great many industrial applications. Figure 9 merely represents one illustrative arrangement and depicts a gas well from which natural gas flows through pumps to dehydrating and scrubbing equipment, as indicated by the legends in the drawings. In order to determine how much moisture remains in the gas, a small sample line is attached to the main line or conduit through which the gas passes and this sample line is connected to the inlet and outlet pipes 68, 69, of the continuous hygrometer A, so that a small quantity of the gas continuously passes through the chamber 56 at substantially the same conditions of temperature-pressure as obtained in the main line of flow. The differential impulse resulting from the balancing photocell 108 and sensory photocell 115 can be fed through a suitable recorder R and monitoring valve V to control the operation of a finishing dehydrator. The valve V will function to direct more or less of the scrubbed gas through the finishing dehydrator depending upon the control impulse received from the hygrometer A. Thus, if the gas is coming through too wet, a greater proportion of it will be passed through the finishing dehydrator and subsequently mixed with the main flow of gas so that the relative moisture content will be suitably adjusted to the desired amount.

It is also possible to provide a modified form of hygrometer A′ for low pressure operation comprising a horizontal base panel or chassis 1′, a vertical front panel 2′, and a removable shell or housing 3′, substantially similar to the previously described hygrometer A, and interiorly provided with the same electronic components and circuitry.

Also mounted upon the front panel 2′ is a substantially rectangular mounting block 120 formed of Lucite or other similar athermanous material and drilled to provide substantial mass and being formed with laterally presented axially aligned intake and outlet ports 121, 122, having internally threaded portions 123, 124, respectively, and opening interiorly into a central cylindrical chamber 125, which, in turn, opens upon the flat top face 126 of the block 120 and is counterbored as at 127 to receive an O-ring gasket 128. Removably seated in the counterbore 127 and sealed by the gasket 128 is a heavy circular sight glass or window 129. Releasably disposed in overlying relation upon the window 129 is a circular collar 130 having a centrally drilled aperture 131 axially aligned with the chamber 125 for accommodating a lens 132 held in place by a threaded retainer ring 133. The collar 130 is also provided on diametrally opposite sides of the aperture 131 with angularly disposed light apertures 134, 135, having lenses 136, 137, respectively, held in place by lens-retaining sleeves 138, 139. Below the chamber 125, the block 120 is drilled and counterbored to provide a recess 140 which is counterbored to form an enlarged, internally threaded socket 141, which, in turn, opens downwardly onto the flat under face 142 of the block 120.

Midway between the intake and outlet ports 121, 122, the block 120 is drilled in the provision of a rearwardly extending, substantially horizontal bore 143, which is counterbored to provide a recess 144 for receiving an O-ring gasket 145 and a cylindrical plug or coil-seal 146 formed preferably of nylon or similar athermanous material and abutting at its outer end against a diametrally enlarged retaining disk 147, which is held thereagainst by means of screws 148, the coil-seal 146 being thereby forced inwardly into tightly sealed engagement with the O-ring gasket 145. Extending axially through and sealed within the coil-seal 146 are tubular copper leads 149, 149', connecting a high-frequency secondary coil 32' with a work coil 33', the coils 32', 33', being substantially identical with the previously described coils 32, 33. As will be seen in Figure 12, the work coil 33' is located centrally with the chamber 125.

Threadedly mounted in the threaded portions 123, 124, respectively, of the intake and outlet ports 121, 122, are inlet and discharge pipes 150, 151, adapted for connection through conventional pressure-reducing valves (not shown) to the pipeline or vessel containing the gas to be tested. It will also be noted that the work coil 33' is centered within the chamber 125 and is more or less in direct line of the flow of gas between the inlet pipe 150 and the outlet pipe 151.

Slip-fitted into the recess 140 concentrically with the chamber 125 is a cold rod 152 formed of steel or other similar metal having good heat conductivity and provided at its upper end with an integral flange-forming collar 153 adapted for tight seated engagement against an O-ring gasket 154 located within the upper end of the recess 140. The cold rod 152 projects downwardly therefrom for immersion in an ice bath, refrigerant, or other temperature-reference medium held within a Dewar flask 155, the upper rim of which is set into an annular channel 156 formed in the under face 142 of the block 120. The Dewar flask 155 is held in place by an adjustable beaker-support 157. At its upper end, the cold rod 152 is axially bored to provide an elongated recess 158 having an intermediate, relatively narrow annular shoulder 159, upon which is seated a tubular insert 160, which projects upwardly from the cold rod through the recess 140 into the chamber 125, terminating centrally within the work coil 33', as best seen in Figures 11 and 12.

Tightly fitted within the upper end face of the insert 160 is a very thin disk 161 having an upwardly presented polished mirror-surface 162. In order that the disk 161 will not be deflected by pressure within the chamber 125, an aperture 163 is provided in the insert 160 so that both sides of the disk 161 are subjected to the same pressure in the same manner as the disk 85 of the previously described embodiment A. Secured against the under face of the disk 161 is a thermocouple t' having leads extending downwardly through the tubular insert 160 and into tubular connectors 162, 162', which are mounted within a glass seating disk 163'. Electrically connected to the leads and extending outwardly through the cold rod 152 are electrical connection wires 164, 164'. Although in this embodiment no meter or recording device is shown, it should be understood that the wires 164, 164', are connected to such a device as the previously described meter 23.

Threadedly mounted at its upper end in the socket 141 and extending downwardly therefrom in outwardly spaced concentric relation to the cold rod 152 is a sheath 165 having axial communication slots 166 and being, in turn, threadedly provided at its lower end with a small cup 167 having a conical bottom portion 168 for supportive engagement with the lower end of the cold rod 152.

The upper horizontal end face 169 of the collar 130 is faced off to provide a smooth seat for engagement against the bottom wall 170 of a small box-like housing 171. The bottom wall 170 is centrally apertured in line with the lens aperture 131 and directly thereabove within the housing 171 is an oblique or periscopic mirror 172 which can be viewed from the front through an aperture 173 formed in the forwardly presented wall 174 of the housing 171. Snugly fitted in the upper end of the housing 171 is a shoulder plug 175 which is drilled and tapped for receiving the lower threaded end of a clamping pin 176 having a diametrally enlarged knurled thumb-knob 177 and being pointed at its upper end, as at 178, for self-centering disposition in a conical seat 179 formed in the under face of a heavy bracket 180, which is, in turn, bolted upon the panel 2' in upwardly spaced relation to the block 120 and along the common vertical center-line of the chamber 125 and cold rod 152. Mounted on the panel 2' and extending outwardly therefrom is an electric light source 181, the beams from which pass upwardly through an aperture 182 formed in a shutter plate 183 also secured to the panel 2'. The light rays impinge upon a balancing photocell 184 operatively mounted upon the panel 2' above the shutter plate 183 and also pass obliquely downwardly through the aperture 134 and lens 136 to the mirror-surface 162 of the disk 161 and are reflected thence through the aperture 135 and lens 137, in the same manner as previously described in connection with embodiment A, to an element 185 of a sensory photocell 186.

As long as the mirror-surface 162 is free of any condensation or dew, the amount of light reflected will be substantially equal to the amount of incident light just as was the case with the previously described embodiment A.

Threadedly mounted in and projecting laterally from the shutter plate 183 is a shutter-forming rod 187 provided on its outer end with a manipulating knob 188 and being turned down on its inner end to a long tapered point 189 which projects into and partially across the aperture 182. By backing off the rod 187, it is possible to withdraw it so that the point 189 does not project into the aperture 182 and thus a maximum beam of light will pass therethrough. On the other hand, by turning the rod 187 so that it is threaded inwardly, the point 189 will project into the aperture 182 and cut down a portion of the light passing therethrough, depending upon the amount of the point which projects into the aperture 182. As a matter of fact, by threading the rod 187 inwardly far enough, it is possible to close the aperture 182 completely.

For most practical purposes, it has been found that a gas can be withdrawn from a pipeline or reaction vessel through a conventional pressure-reducing valve and passed through the chamber 125 of the hygrometer A' to obtain a definitive dew point reading which can be related, by approprite computations, to the dew point conditions in the reaction vessel or pipeline at the pressure and temperature existing therein. It has also been found in connection with the dew point hygrometer A' that exceedingly accurate and close-following temperature response can be achieved by use of the slotted sheath 165 which more efficiently conducts extraneous heat away from the walls of the chamber 125 while, at the same time, exposing the cold rod 152 to the temperature of the cooling medium in the Dewar flask 155. Since the cup 167 can readily be unthreaded and removed, it is possible to remove the cold rod 152 for cleaning, repair, and similar purposes, without dismantling the entire device.

The hygrometers A, A', of the present invention are versatile instruments for continuously indicating the precise temperature at which any component of a gas will form a dew or frost and will continuously indicate or control the concentration of any component whose phase change will fog the mirror. The temperature can be any temperature within reach of a liquid air bath (−170° C.). A suitable train of these instruments and associated traps can be used to record the concentration of more than one component of a gas.

It should be understood that changes and modifications in the form, construction, arrangement, and combination of the several parts of the apparatus for measuring and controlling the composition of vapor and in the methods of using the same may be made and substituted for those herein shown and described without departing from the nature and principle of our invention.

Having thus described our invention, what we claim and desire to secure by Letters Patent is:

1. An instrument for use in measuring the vapor content of a gas, said instrument comprising a body having relatively large mass and being internally provided with a chamber having a wall provided with a transparent window, means for passing the gas through the chamber in a continuously flowing stream, a mirror in said chamber in the path of the flowing stream of gas, said mirror having a front face and a rear face, means for supporting the mirror in the path of the gas as it flows through the chamber, said means being so constructed as to provide access of gas to both faces of the mirror, a light source positioned for directing a beam of light upon the mirror, a heat insulating lining on the interior side wall of the chamber in concentric relation around the mirror, means for measuring the amount of light reflected from the mirror, and means for adjusting the temperature of the mirror to produce a condensate film on the mirror which modifies the amount of reflected light and thereby affords a measure of the density of said condensate film.

2. An instrument for use in measuring the vapor content of a gas comprising a main body element having a chamber formed therein, said body element further being provided with passageways opening into said chamber and being respectively adapted to lead gas into and out of said chamber, a tubular rod mounted in said body element having an axial bore and being disposed with one end projecting into the chamber, the other end of the rod projecting outwardly from said chamber, refrigerating means disposed in thermal relation to the outwardly projecting end of the rod, a mirror mounted directly upon the internal end of the rod, said mirror having a polished face presented away from the rod toward the interior of the chamber and a rear face presented to the bore of the rod, said rod having its bore vented to the chamber so that the mirror is exposed on both faces to the pressure and temperature conditions of the chamber, said body element being further provided with a recess opening into said chamber in opposed relation to the polished surface of the mirror, a transparent window mounted in said recess, a sealing collar disposed over said window, wedge means removably associated with the sealing collar for holding the window in gas-tight position within the recess whereby said wedge means can be quickly removed to permit removal of the sealing collar and access to said chamber and mirror, means located externally of said chamber for impinging a beam of light through the window onto the polished surface of the mirror, and sensing means also located externally of the chamber for measuring the intensity of the reflected light from the mirror.

3. An instrument for use in measuring the vapor content of a gas comprising a main body element having a chamber formed therein, said body element further being provided with passageways opening into said chamber and being respectively adapted to lead gas into and out of said chamber, a tubular rod mounted in said body element having an axial bore and being disposed with one end projecting into the chamber, the other end of the rod projecting outwardly from said chamber, refrigerating means disposed in thermal relation to the outwardly projecting end of the rod, a mirror mounted directly upon the internal end of the rod, said mirror having a polished face presented away from the rod toward the interior of the chamber, and a rear face presented to the bore of the rod, said rod having its bore vented to the chamber so that the mirror is exposed on both faces to the pressure and temperature conditions of the chamber, said body element being further provided with a recess opening into said chamber in opposed relation to the polished surface of the mirror, a transparent window mounted in said recess, a sealing collar disposed over said window, threaded means associated with the sealing collar for holding the window in gas-tight position within the recess whereby said threaded means can be quickly removed to permit removal of the sealing collar and access to said chamber and mirror, means located externally of said chamber for impinging a beam of light through the window onto the polished surface of the mirror, and sensing means also located externally of the chamber for measuring the intensity of the reflected light from the mirror.

4. An instrument for use in measuring the vapor content of a gas comprising a main body element having a chamber formed therein, said body element further being provided with passageways opening into said chamber and being respectively adapted to lead gas into and out of said chamber, a tubular rod mounted in said body element having an axial bore and being disposed with one end projecting into the chamber, the other end of the rod projecting outwardly from said chamber, refrigerating means disposed in thermal relation to the outwardly projecting end of the rod, a mirror mounted directly upon the internal end of the rod, said mirror having a polished face presented away from the rod toward the interior of the chamber and a rear face presented to the bore of the rod, said rod having its bore vented to the chamber so that the mirror is exposed on both faces to the pressure and temperature conditions of the chamber, said body element being further provided with a recess opening into said chamber in opposed relation to the polished surface of the mirror, a transparent window mounted in said recess, a sealing collar disposed over said window, clamping means associated with the sealing collar for releasably holding the window in gas-tight position within the recess whereby said clamping means can be quickly removed to permit removal of the sealing collar and access to said chamber and mirror, means located externally of said chamber for impinging a beam of light through the window onto the polished surface of the mirror, and sensing means also located externally of the chamber for measuring the intensity of the reflected light from the mirror.

5. An instrument for use in measuring the vapor content of a gas comprising a main body element having a chamber formed therein, said body element further being provided with passageways opening into said chamber and being respectively adapted to lead gas into and out of said chamber, a rod mounted in said body element and having one end projecting into the chamber, the other end of the rod projecting outwardly from said chamber, refrigerating means disposed in thermal relation to the outwardly projecting end of the rod, a mirror mounted in thermal relation to the internal end of the rod, said mirror being disposed with its polished face presented away from the rod toward the interior of the chamber, said body element being further provided with a recess opening into said chamber in opposed relation to the polished surface of the mirror, a transparent window mounted in said recess, means associated with the window for holding the window in gas-tight position within the recess, means located externally of said chamber for impinging a beam of light through the window onto the polished surface of the mirror, adjustable heating means disposed within the chamber in thermal relation to the internal end of the rod for adjusting the temperature of the gas within the chamber as it passes over the mirror, and a tubular sheath disposed in annularly spaced relation around the externally projecting end of the rod, said sheath having a plurality of apertures for permitting access of refrigerant to the rod and further being thermally connected at its upper end to the body element for conducting heat away from said body element to the refrigerant so as to maintain the chamber walls relatively cool and at substantially constant temperature.

6. An instrument for use in measuring the vapor content of a gas comprising a main body element having a chamber formed therein, said body element further being provided with passageways opening into said chamber and being respectively adapted to lead gas into and out of said chamber, a rod mounted in said body element and having one end projecting into the chamber, the other end of the rod projecting outwardly from said chamber, refrigerating means disposed in thermal relation to the outwardly projecting end of the rod, a mirror mounted in thermal relation to the internal end of the rod, said mirror being disposed with its polished face presented away from the rod toward the interior of the chamber, said body element being further provided with a recess opening into said chamber in opposed relation to the polished surface of the mirror, a transparent window mounted in said recess, means associated with the window for holding the window in gas-tight position within the recess, means located externally of said chamber for impinging a beam of light through the window onto the polished surface of the mirror, adjustable heating means disposed within the chamber in thermal relation to the internal end of the rod for adjusting the temperature of the gas within the chamber as it passes over the mirror, and a tubular sheath disposed in annularly spaced relation around the externally projecting end of the rod, said sheath having a plurality of apertures for permitting access of refrigerant to the rod and further being thermally connected at its upper end to the body element for conducting heat away from said body element to the refrigerant so as to maintain the chamber walls relatively cool and at substantially constant temperature, said sheath being provided at its lower end with a reduced bore forming a seat for retentive engagement with the lower extremity of the externally projecting end of the rod.

7. An instrument for use in measuring the vapor content of a gas comprising a main body element having a chamber formed therein, said body element further being provided with passageways opening into said chamber and being respectively adapted to lead gas into and out of said chamber, a rod mounted in said body element and having one end projecting into the chamber, the other end of the rod projecting outwardly from said chamber refrigerating means disposed in thermal relation to the outwardly projecting end of the rod, a mirror mounted in thermal relation to the internal end of the rod, said mirror being disposed with its polished face presented away from the rod toward the interior of the chamber, said body element being further provided with a recess opening into said chamber in opposed relation to the polished surface of the mirror, a transparent window mounted in said recess, means associated with the window for holding the window in gas-tight position within the recess, means located externally of said chamber for impinging a beam of light through the window onto the polished surface of the mirror, sensing means also located externally of the chamber for measuring the intensity of the reflected light from the mirror, an auxiliary sensing element mounted in outwardly spaced relation to the light emitting means for simultaneously receiving light rays directly therefrom, potentiometric means connecting the first named sensing means and the auxiliary sensing means for establishing a differential measurement therebetween, and shutter means interposed between the light emitting means and the auxiliary sensing means for adjusting the quantity of light impinging upon the auxiliary sensing means.

8. An instrument for use in measuring the vapor content of a gas, said instrument comprising a body having a relatively large mass and being internally provided with a chamber having a wall provided with a transparent window, means for passing the gas through the chamber in a continuously flowing stream, an elongated tubular stem projecting into said chamber in the path of the flowing stream of gas, a mirror mounted in the end of the stem, said mirror having an outer face presented directly to the chamber and a rear face presented to the interior of the tubular stem, said stem having an aperture in its side wall so that its interior is open to the chamber and the rear face of the mirror is subjected to the conditions of the chamber, a light source positioned for directing a beam of light upon the mirror, means for measuring the amount of light reflected from the mirror, and means for adjusting the temperature of the mirror to produce a condensate film on the mirror which modifies the amount of reflected light and thereby affords a measure of the density of said condensate film.

References Cited in the file of this patent

UNITED STATES PATENTS

| | | |
|---|---|---|
| Re. 23,287 | Friswold | Oct. 24, 1950 |
| 2,108,173 | Martin et al. | Feb. 15, 1938 |
| 2,268,785 | Thornthwaite | Jan. 6, 1942 |
| 2,415,776 | Walton | Feb. 11, 1947 |
| 2,455,966 | Ackley | Dec. 14, 1948 |
| 2,459,810 | Graves | Jan. 25, 1949 |
| 2,566,307 | Boyle | Sept. 4, 1951 |
| 2,624,195 | Van Alen | Jan. 6, 1953 |
| 2,662,393 | Rzasa | Dec. 15, 1953 |

FOREIGN PATENTS

| | | |
|---|---|---|
| 591,542 | Great Britain | Aug. 21, 1947 |